H. E. DEWEY.
Horse Hay-Fork.

No. 73,515. Patented Jan. 21, 1868.

Witnesses:

Inventor:

United States Patent Office.

HERBERT E. DEWEY, OF AURORA, ILLINOIS.

Letters Patent No. 73,515, dated January 21, 1868.

IMPROVEMENT IN HORSE HAY-FORKS.

The Schedule referred to in these Letters Patent and making part of the same.

TO ALL WHOM IT MAY CONCERN:

Be it known that I, HERBERT E. DEWEY, of Aurora, in the county of Kane, and State of Illinois, have invented a new and useful Improvement in Screw-Forks for Elevating Hay; and I do hereby declare and make known that the following is a full, clear, and exact description of the same, reference being had to the accompanying drawings, and the letters and figures marked thereon, which form part of this specification.

My said invention relates to that class of devices for grasping and elevating hay, straw, and other similar products, which are operated by being screwed into the hay or other substance to be elevated, and by being screwed out from the same when it is required to detach and deposit the load in the desired position. And to this end my said invention consists in combining, with a screw-fork, a spool, upon which the cord is wound, and from which it is unwound, and two sheaves under which said cord passes, to facilitate the operation of the fork, as hereinafter fully set forth.

To enable those skilled in the art to make and use my said invention, I will now describe the same with particularity, making reference in so doing to the aforesaid drawings, in which—

Figure 1:
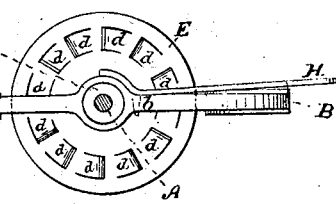
Figure 2:
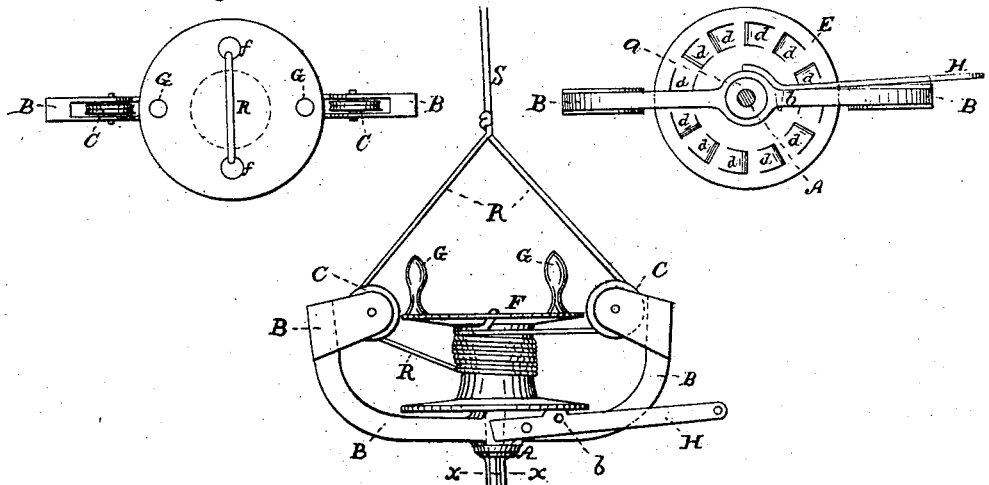
Figure 3:
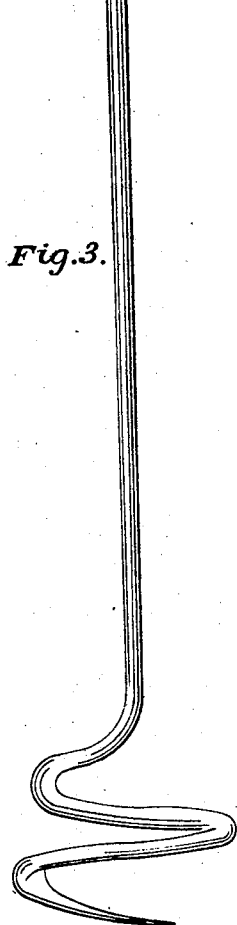

Figure 1 represents a plan or top view of my invention.
Figure 2 is a bottom view of the same, in section at $x$, in fig. 3, and
Figure 3 is a side view or elevation of said invention.

Similar letters of reference in the several figures denote the same parts of my invention.

A represents the fork, whose shank passes up through a bearing at the middle of the curved arm B, which supports, upon its upper ends, sheaves C C, as shown. The shank of the fork rotates freely in its bearing in the arm B, which rests upon a collar, $a$, upon the said shank. Upon the shank of the fork, above the arm B, is rigidly fixed a spool, D, provided with lower and upper flanges E and F, between which a cord or rope, R, is wound or unwound, said cord passing through holes $ff$ in the upper flange, as shown, the ends passing under the sheaves C C, and are connected to the elevating-rope S, as shown in the drawings. G G represent pins upon the spool-flange F, whereby the same and the fork may be turned to screw said fork into the hay to be elevated. H represents an arm pivoted at $b$ to the arm B, and is provided with a projection or stop, $c$, which enters the recesses $d$ in the lower side of flange E, which are shown in fig. 2. When the fork has been screwed into the hay, the arm H is raised sufficiently to throw the latch or stop $c$ into one of the recesses $d$, which thus prevents the rotation of the fork while the hay is being elevated. When the operator desires to release the hay from the fork, the latch $c$ is withdrawn, and the weight of the hay causes the fork to rotate rapidly in the reverse direction, and thus unscrews the fork from the hay, and deposits it as desired.

Having described the construction and operation of my improvement, I will now specify what I claim, and desire to secure by Letters Patent.

I claim, in combination with a screw-fork, A, operating substantially as described, the spool D E F, and sheaves C C, arranged with the cord R, substantially as, and for the purposes specified.

HERBERT E. DEWEY.

Witnesses:
J. W. PURRINGTON,
G. A. PFRANGLE.